United States Patent

Rancich et al.

[11] Patent Number: 6,017,565
[45] Date of Patent: Jan. 25, 2000

[54] METHOD FOR AUTOMATED CONTINUOUS PRODUCTION OF CHEWING GUM

[75] Inventors: Joseph D. Rancich, Park Ridge; Ronald A. Brix; Rodney F. Onusaitis, both of Darien; Karl B. Bucholz, LaGrange; Carl S. Peterson, Roselle; George W. Lorenz, Downers Grove, all of Ill.; Dennis K. Moriarty, Munster, Ind.; Anthony R. Banasiak, Brookfield, Ill.

[73] Assignee: Wm. Wrigley Jr. Company, Chicago, Ill.

[21] Appl. No.: 09/083,293

[22] Filed: May 22, 1998

Related U.S. Application Data

[62] Division of application No. 08/604,167, Feb. 21, 1996, Pat. No. 5,827,549.

[51] Int. Cl.⁷ ....................................................... A23G 3/30
[52] U.S. Cl. ................................. 426/3; 426/5; 426/231; 426/232; 426/233; 426/517; 426/519
[58] Field of Search .................................. 426/231, 232, 426/233, 3, 5, 414, 517, 518, 519

[56] References Cited

U.S. PATENT DOCUMENTS

| | | | |
|---|---|---|---|
| 1,852,005 | 4/1932 | Garbutt . | |
| 1,855,017 | 4/1932 | Geller . | |
| 1,887,930 | 11/1932 | Hatherell . | |
| 1,953,295 | 4/1934 | Garbutt | 99/11 |
| 2,123,531 | 7/1938 | Hatherell | 99/135 |
| 2,125,562 | 8/1938 | Hatherell | 99/135 |
| 2,197,240 | 4/1940 | Hatherell | 99/135 |
| 2,256,190 | 9/1941 | Bowman | 107/54 |
| 2,284,804 | 6/1942 | De Angelis | 99/135 |
| 2,288,100 | 6/1942 | Mason | 99/135 |
| 2,383,145 | 8/1945 | Moose | 99/135 |
| 2,468,393 | 4/1949 | Corkery et al. | 99/135 |
| 3,618,902 | 11/1971 | Brennen, Jr. | 259/6 |
| 3,644,169 | 2/1972 | Phillips | 99/135 |
| 3,795,744 | 3/1974 | Ogawa et al. | 426/3 |
| 3,826,847 | 7/1974 | Ogawa et al. | 426/3 |
| 3,984,574 | 10/1976 | Comollo | 426/4 |
| 3,995,064 | 11/1976 | Ehrgott et al. | 426/3 |
| 3,995,791 | 12/1976 | Schoppee | 242/58.1 |
| 4,064,274 | 12/1977 | Mackay et al. | 426/3 |
| 4,068,004 | 1/1978 | Carlin et al. | 426/3 |

(List continued on next page.)

FOREIGN PATENT DOCUMENTS

| | | |
|---|---|---|
| 0 273 809 A2 | 7/1988 | European Pat. Off. . |
| 0 524 902 A1 | 1/1993 | European Pat. Off. . |
| 2 635 441 | 2/1990 | France . |

(List continued on next page.)

OTHER PUBLICATIONS

United States Statutory Invention Registration Document No. H1241, Inventors: Synosky et al.; Publication Date Oct. 5, 1993.

*Food Manufacturing*, "Extrusion: does chewing gum pass the taste test?" pp. 48–50, Sep. 1987.

*Ingredients Extra*, "Extrusion technology for chewing gum production" pp. 4 and 12, Jun. 1994.

(List continued on next page.)

*Primary Examiner*—David Lacey
*Assistant Examiner*—Drew Becker
*Attorney, Agent, or Firm*—Hill & Simpson

[57] ABSTRACT

A system and method are provided for automatically and continuously producing chewing gum and/or chewing gum base. A system controller receives inputs of parameters necessary for production. Ingredients are automatically and continuously fed and mixed to form a desired end product. During production of chewing gum, the gum is automatically and continuously discharged from the mixer and can be automatically dusted, rolled, scored and wrapped. The system is continuously monitored with appropriate sensing devices. Signals indicative of the sensed conditions are sent to the controller, and the system automatically adjusts to produce a consistent end product. An alarm is activated upon sensing of a predetermined condition.

30 Claims, 7 Drawing Sheets

U.S. PATENT DOCUMENTS

| | | | |
|---|---|---|---|
| 4,088,430 | 5/1978 | Giles | 425/144 |
| 4,187,320 | 2/1980 | Koch et al. | 426/3 |
| 4,202,906 | 5/1980 | Ogawa et al. | 426/3 |
| 4,208,431 | 6/1980 | Friello et al. | 426/5 |
| 4,217,368 | 8/1980 | Witzel et al. | 426/5 |
| 4,224,345 | 9/1980 | Tezuka et al. | 426/3 |
| 4,252,830 | 2/1981 | Kehoe et al. | 426/5 |
| 4,254,148 | 3/1981 | Ogawa et al. | 426/3 |
| 4,305,962 | 12/1981 | del Angel | 426/3 |
| 4,328,549 | 5/1982 | Avery | 364/469 |
| 4,352,822 | 10/1982 | Cherukuri et al. | 426/4 |
| 4,357,354 | 11/1982 | Kehoe et al. | 426/3 |
| 4,379,169 | 4/1983 | Reggio et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,459,311 | 7/1984 | DeTora et al. | 426/3 |
| 4,490,395 | 12/1984 | Cherukuri et al. | 426/3 |
| 4,514,423 | 4/1985 | Tezuka et al. | 426/3 |
| 4,515,769 | 5/1985 | Merritt et al. | 424/49 |
| 4,555,407 | 11/1985 | Kramer et al. | 426/5 |
| 4,590,075 | 5/1986 | Wei et al. | 426/3 |
| 4,613,471 | 9/1986 | Harris | 264/40.1 |
| 4,671,908 | 6/1987 | Gwinn et al. | 264/40.7 |
| 4,711,784 | 12/1987 | Yang | 426/5 |
| 4,721,620 | 1/1988 | Cherukuri et al. | 426/6 |
| 4,738,854 | 4/1988 | Friello et al. | 426/3 |
| 4,740,376 | 4/1988 | Yang | 426/5 |
| 4,794,003 | 12/1988 | Cherukuri et al. | 426/6 |
| 4,816,265 | 3/1989 | Cherukuri et al. | 426/3 |
| 4,850,842 | 7/1989 | Van Alstine | 425/205 |
| 4,872,884 | 10/1989 | Cherukuri et al. | 426/3 |
| 4,876,095 | 10/1989 | Yang | 426/3 |
| 4,882,172 | 11/1989 | Van Alstine | 425/113 |
| 4,933,189 | 6/1990 | Cherukuri et al. | 426/3 |
| 4,940,594 | 7/1990 | Van Alstine | 426/231 |
| 4,968,511 | 11/1990 | D'Amelia et al. | 426/6 |
| 4,992,280 | 2/1991 | Yung Chu et al. | 426/5 |
| 4,993,211 | 2/1991 | Piano | 53/435 |
| 5,023,093 | 6/1991 | Cherukuri et al. | 426/3 |
| 5,045,325 | 9/1991 | Lesko et al. | 426/5 |
| 5,059,103 | 10/1991 | Bruckmann et al. | 425/67 |
| 5,075,291 | 12/1991 | Duross | 514/60 |
| 5,110,607 | 5/1992 | Yang | 426/3 |
| 5,135,760 | 8/1992 | Degady et al. | 426/5 |
| 5,158,725 | 10/1992 | Handa et al. | 426/3 |
| 5,158,789 | 10/1992 | Duross | 426/3 |
| 5,229,148 | 7/1993 | Copper | 476/502 |
| 5,324,530 | 6/1994 | Kehoe et al. | 426/516 |
| 5,397,580 | 3/1995 | Song et al. | 426/5 |
| 5,413,799 | 5/1995 | Song et al. | 426/6 |
| 5,415,880 | 5/1995 | Song et al. | 426/6 |
| 5,419,919 | 5/1995 | Song et al. | 426/5 |
| 5,486,366 | 1/1996 | Song et al. | 426/5 |
| 5,538,742 | 7/1996 | McHale et al. | 426/5 |
| 5,543,160 | 8/1996 | Song et al. | 426/3 |
| 5,545,416 | 8/1996 | Broderick et al. | 426/3 |
| 5,562,936 | 10/1996 | Song et al. | 426/63 |

FOREIGN PATENT DOCUMENTS

| | | |
|---|---|---|
| 1 538 785 | 1/1979 | United Kingdom . |
| 2 049 705 | 12/1980 | United Kingdom . |
| WO 95/08272 | 3/1995 | WIPO . |
| WO 95/10194 | 4/1995 | WIPO . |
| WO 95/10948 | 4/1995 | WIPO . |
| WO 95/10949 | 4/1995 | WIPO . |
| WO 96/08157 | 3/1996 | WIPO . |
| WO 96/08158 | 3/1996 | WIPO . |
| WO 96/08159 | 3/1996 | WIPO . |
| WO 96/08160 | 3/1996 | WIPO . |
| WO 96/08161 | 3/1996 | WIPO . |
| WO 96/08162 | 3/1996 | WIPO . |

OTHER PUBLICATIONS

*J. Agric. Food Chem.,* "Thermal Decomposition of Some Phenolic Antioxidants" pp. 1063–69, vol. 39, 1991.

Two page document entitled "Mixing Processes used in the Manufacture of Chewing Gum," by R. Schilling, undated.

Three page letter from Buss America dated Aug. 22, 1989 describing Buss kneading extruder and its uses.

Brochure entitled "D–TEX Continuous Compounding Twin Screw Extruders," 4 pages, published by Davis–Standard (undated).

Brochure entitled "Continuous Mixers For the Polymer Industry," Bulletin No. 234–B, published by Farrel Corporation, 1991.

Brochure entitled "Farrel–Rockstedt Twin–Screw Extruders," 6 pages, published by Farrel Corporation (undated).

Brochure entitled, "Leistritz Extrusionstechnik, The Universal Laboratory Extruder System," 24 pages, published by American Leistritz Extrude Corporation (undated).

Brochure entitled, "Leistritz Extrusionstechnik, The Multi––Extrusion–System for Mixing–, Kneading– and Strandextrusion ZSE GG+GL," 20 pages, published by American Leistritz Extruder Corporation (undated).

Two page document from Rubber Extrusion Technology program, dated Feb. 8–10, 1993.

Brochure entitled "Buss Kneading Extruder Technology for the Food Industry," 18 pages, (undated).

Brochure entitled "Extrusion Processing of Shear–Sensitive Food Products," 23 pages, Nov. 1987.

Advertisement entitled "Buss Extrusion Technology (40 years of experience included)," 1 page, undated.

Brochure entitled "The Teledyne Readco Continuous Processor," 2 pages, published by Teledyne Readco, York, Pa. (undated).

Brochure entitled "Mitsubishi PTE Twin–Screw Extruder," 6 pages, Mitsubishi Heavy Industries, Ltd. (date unknown).

Brochure entitled "Mitsubishi Thermoplastic Extruders," 10 pages, Mitsubishi Heavy Industries, Ltd. (date unknown).

Brochure entitled "Buss Technology For The Continuous Compound of Gum Base," by George Fischer of Buss Gruppe, Apr. 22, 1995, 9 pages.

Brochure entitled "Buss Technology For The Continuous Compounding of Chewing Gum and Bubble Gum," by Bernd Rose of Buss Gruppe, Apr. 24, 1995, 8 pages.

Brochure entitled "Production of Chewing Gum and Bubble Gum Masses on the Buss Kneading–Extruder," Mar. 1985, 8 pages.

Brochure entitled, "Verfahrenstecnieche Orientierung NR. 42" (Process Technology Guide No. 42), Aug. 22, 1983, 25 pages (and an English translation thereof, 15 pages).

Article entitled, "Herstellung und Aromatisierung von Kaugummi auf Basis von Saccharose und Zuckeraustrausch–stoffen," Jan. 1981, 21 pages.

Article entitled, "Chewing Gum Formulation," from *The Manufacturing Confectioner,* Sep. 1988, 8 pages.

METHOD FOR AUTOMATED CONTINUOUS PRODUCTION OF CHEWING GUM

This is a division of U.S. patent application Ser. No. 08/604,167, filed Feb. 21, 1996, now U.S. Pat. No. 5,827,549.

FIELD OF THE INVENTION

The present invention is a process control system and a method for automated continuous production of chewing gum.

BACKGROUND OF THE INVENTION

Conventionally, chewing gum base and chewing gum product have been manufactured using separate mixers, different mixing technologies and, often, at different factories. One reason for this is that the optimum conditions for manufacturing gum base, and for manufacturing chewing gum from gum base and other ingredients such as sweeteners and flavors, are so different that it has been impractical to integrate both tasks. Chewing gum base manufacture, on the one hand, involves the dispersive (often high shear) mixing of difficult-to-blend ingredients such as elastomer, filler, elastomer plasticizer, base softeners/emulsifiers and, sometimes wax, and typically requires long mixing times. Chewing gum product manufacture, on the other hand, involves combining the gum base with other ingredients such as product softeners, bulk sweeteners, high intensity sweeteners and flavoring agents using distributive (generally lower shear) mixing, for shorter periods.

In order to improve the efficiency of gum base and gum product manufacture, there has been a trend toward the continuous manufacture of chewing gum bases and products. U.S. Pat. No. 3,995,064, issued to Ehrgott et al., discloses the continuous manufacture of gum base using a sequence of mixers or a single variable mixer. U.S. Pat. No. 4,459,311, issued to DeTora et al., also discloses the continuous manufacture of gum base using a sequence of mixers. Other continuous gum base manufacturing processes are disclosed in European Publication No. 0,273,809 (General Foods France) and in French Publication No. 2,635,441 (General Foods France).

U.S. Pat. No. 5,045,325, issued to Lesko et al., and U.S. Pat. No. 4,555,407, issued to Kramer et al., disclose processes for the continuous production of chewing gum products. In each case, however, the gum base is initially prepared separately and is simply added into the process. U.S. Pat. No. 4,968,511, issued to D'Amelia et al., discloses a chewing gum product containing certain vinyl polymers which can be produced in a direct one-step process not requiring separate manufacture of gum base. However, D'Amelia et al. focus on batch mixing processes not having the efficiency and product consistency achieved with continuous mixing. Also, the single-step processes are limited to chewing gums containing unconventional bases which lack elastomers and other critical ingredients.

In order to simplify and minimize the cost of chewing gum manufacture, there is a need or a desire in the chewing gum industry for an integrated continuous manufacturing process having the ability to combine chewing gum base ingredients and other chewing gum ingredients in a single mixer, which can be used to manufacture a wide variety of chewing gums. Furthermore, there is a need to perform the production of chewing gum and/or chewing gum base in not only a continuous fashion, but automatically, with minimal or no human intervention.

SUMMARY OF THE INVENTION

The present invention is a process control system and method for the automated continuous production of a wide variety of chewing gum products. The present invention may use a single high efficiency mixer which does not require the separate manufacture of chewing gum base.

To this end, in an embodiment, a system is provided for the automatic and continuous production of chewing gum. The system has means for inputting operational parameters; means for automatically feeding ingredients necessary for continuous production of chewing gum; means for collecting and automatically and continuously mixing the ingredients; and means for controlling the means for automatically feeding and the means for automatically and continuously mixing by input of the operational parameters to the means for controlling.

In an embodiment, means is provided for monitoring ingredient temperatures and providing a signal indicative thereof to the means for controlling.

In an embodiment, means is provided for monitoring feed rate of the ingredients fed by the means for automatically feeding and providing a signal indicative thereof to the means for controlling.

In an embodiment, means for automatically forming the mixed ingredients into a predetermined shape discharged from the means for collecting and automatically and continuously mixing is also provided.

In an embodiment, means is provided for automatically dusting the predetermined shape formed in the means for automatically forming.

In an embodiment, means for automatically scoring the predetermined shape is provided.

In an embodiment, means for automatically wrapping the predetermined shape following division thereof into defined units is provided.

In another embodiment, a system is provided for automatic and continuous production of chewing gum base. The systems comprises: means for inputting operational parameters; means for automatically and continuously feeding ingredients necessary for continuous production of chewing gum base; means for collecting and automatically and continuously mixing the ingredients; and means for controlling the means for automatically and continuously feeding and the means for automatically and continuously mixing by input of the operational parameters to the means for controlling.

In another embodiment of the present invention, a method is provided for automatically and continuously producing chewing gum. The method comprises the steps of: inputting operational parameters; automatically and continuously feeding ingredients into a mixer wherein the ingredients are necessary for continuous production of chewing gum; automatically and continuously mixing the ingredients in the mixer; and controlling the automatic and continuous feeding and mixing based on the operational parameters.

In an embodiment, the method further comprises the steps of: monitoring properties of the ingredients; and providing a signal indicative of the properties.

In an embodiment, the method further comprises the step of providing an alarm to signal an error condition during production of the chewing gum.

In an embodiment, the method further comprises the steps of: monitoring feed rate of the ingredients fed during production; and providing a signal indicative of the feed rate.

In an embodiment, the method further comprises the step of displaying the operational parameters continuously and in real time during production.

In an embodiment, the method further comprises the steps of: continuously discharging the mixed ingredients; and automatically forming the mixed ingredients into a predetermined shape.

In an embodiment, the method further comprises the step of automatically wrapping the predetermined shape following division into a plurality of defined units.

In yet another embodiment of the present invention, a system is provided for automatic and continuous production of chewing gum. The system has means for automatically and continuously feeding ingredients necessary for continuously producing the chewing gum; means for continuously mixing the ingredients to form a mixture; means for automatically and continuously discharging the mixture from the means for mixing; means for automatically forming the mixture into a predetermined shape; means for automatically scoring the predetermined shape; and means for automatically wrapping the predetermined shape following division into a plurality of defined units.

In an embodiment, the system further comprises means for inputting operational parameters and controller means receiving the operational parameters and controlling the system based on the operational parameters.

In an embodiment, the system further comprises means for monitoring the ingredients and mixture during feeding and mixing.

In an embodiment, the system further comprises means for monitoring the mixture during forming, scoring and wrapping.

In an embodiment, the system further comprises an alarm means providing a signal indicative of a condition sensed during the production.

In another embodiment of the present invention, a method for automatically and continuously producing chewing gum is provided. The method comprises the steps of: feeding ingredients into a continuous mixer; mixing the ingredients in the continuous mixer to form a mixture; discharging the mixture from the container; automatically forming the mixture into a predetermined shape; scoring the predetermined shape to define units; and automatically and continuously wrapping the predetermined shape following division into defined units.

In an embodiment, the method comprises the step of dusting the predetermined shape with a substance.

In an embodiment, the method comprises the step of inputting operational parameters necessary for producing the chewing gum.

In an embodiment, the method comprises the step of sensing properties of the ingredients and the mixture during production.

In an embodiment, the method comprises the step of controlling production based on the sensed properties.

In an embodiment, the method comprises the steps of sensing properties of the ingredients and the mixture during production and comparing the sensed properties with the operational parameters.

In an embodiment, the method comprises the step of controlling production of the chewing gum based on the comparison.

In an embodiment, the method comprises the step of providing an alarm indicative of a predetermined condition detected during production.

In an embodiment, the method comprises the step of displaying continuously and in real time status of production and other operational parameters.

With the foregoing in mind, it is a feature and advantage of the invention to provide an automated continuous system and method for manufacturing chewing gum.

It is also a feature and advantage of the invention to provide an automated continuous system and method for making chewing gum which requires less labor than conventional manufacturing methods.

It is also a feature and advantage of the invention to provide an automated continuous system and method for producing chewing gum having greater product consistency, less thermal degradation, less thermal history, and less contamination than chewing gum produced using conventional batch mixing processes that require longer manufacturing times and more manufacturing steps.

A still further feature and advantage of the present invention is to provide an automated continuous system and method for producing chewing gum that substantially reduces waste material.

Yet another feature and advantage of the present invention is to provide an automated continuous system and method that reduces both errors and variability in manufacturing.

The foregoing and other features and advantages of the invention will become further apparent from the following detailed description of the presently preferred embodiments, read in conjunction with the accompanying examples and drawings. The detailed description, examples and drawings are intended to be merely illustrative rather than limiting, the scope of the invention being defined by the appended claims and equivalents thereof.

Additional features and advantages of the present invention are described in, and will be apparent from, the detailed description of the presently preferred embodiments and from the drawings

DETAILED DESCRIPTION OF THE PRESENTLY PREFERRED EMBODIMENTS

The present invention provides an automated control process that can be used to manage a continuous extruder mixing of base, gum or a combination of base and gum in a single extruder. Furthermore, control of downstream operations following extrusion, such as sheeting, dusting, scoring and wrapping, is also disclosed.

The present invention is a method for the total manufacture of chewing gum, using a single continuous high-efficiency mixer, without requiring the separate manufacture of chewing gum base. This method can be advantageously performed using a continuous mixer whose mixing screw is composed primarily of precisely arranged mixing elements with only a minor fraction of simple conveying elements. A presently preferred mixer is a blade-and-pin mixer exemplified in FIG. 1. A blade-and-pin mixer uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Illinois.

Figure 1:
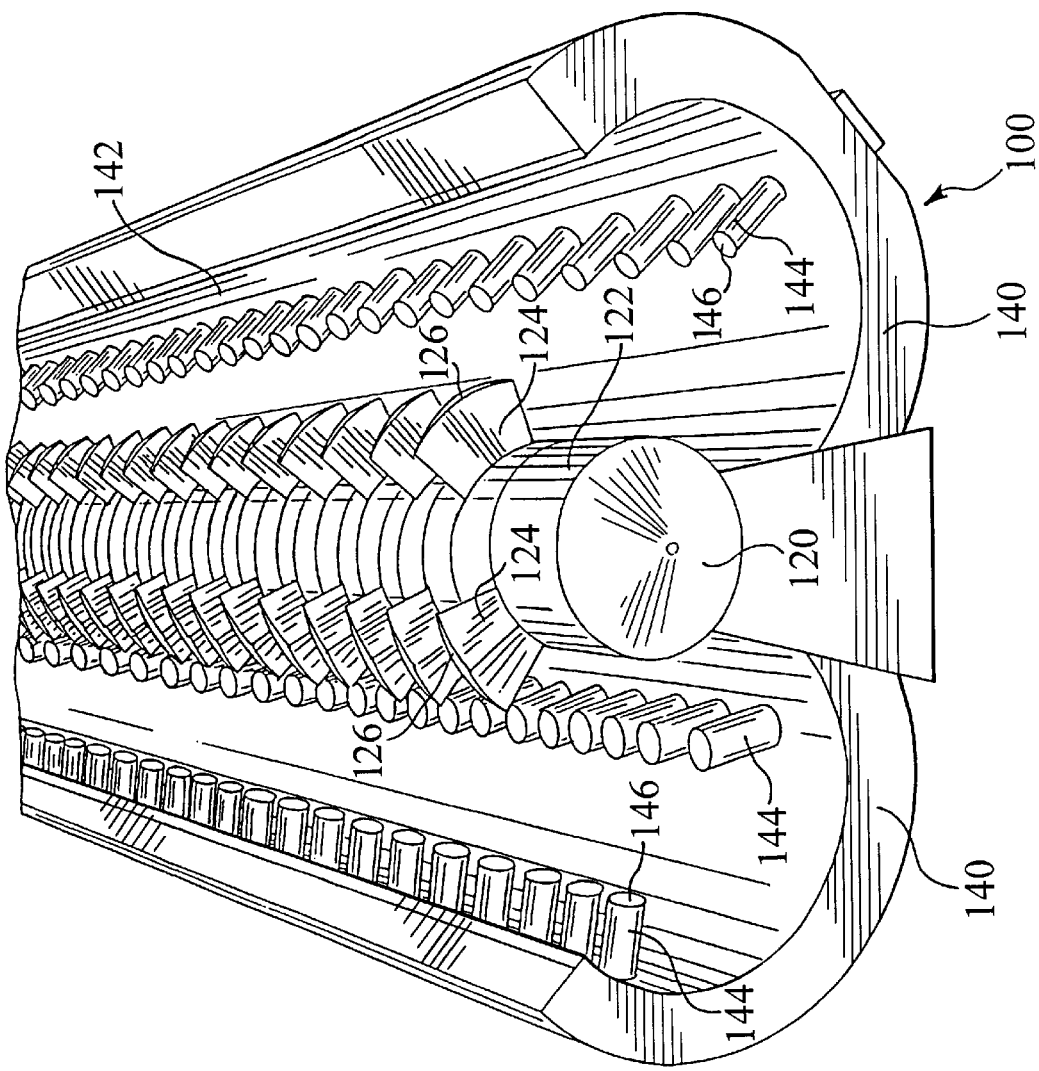
FIG. 1 is a partial exploded perspective view of a preferred Buss high efficiency mixer used to practice the method of the invention, illustrating a mixing barrel and mixing screw arrangement.

Referring to FIG. 1, a presently preferred blade-and-pin mixer 100 includes a single mixing screw 120 turning inside a barrel 140 which, during use, is generally closed and completely surrounds the mixing screw 120. The mixing screw 120 includes a generally cylindrical shaft 122 and three rows of mixing blades 124 arranged at evenly spaced locations around the screw shaft 122 (with only two of the rows being visible in FIG. 1). The mixing blades 124 protrude radially outward from the shaft 122, with each one resembling the blade of an axe.

The mixing barrel 140 includes an inner barrel housing 142 which is generally cylindrical when the barrel 140 is closed around the screw 120 during operation of the mixer 100. Three rows of stationary pins 144 are arranged at evenly spaced locations around the screw shaft 142, and protrude radially inward from the barrel housing 142. The pins 144 are generally cylindrical in shape, and may have rounded or bevelled ends 146.

The mixing screw 120 with blades 124 rotates inside the barrel 140 and is driven by a variable speed motor (not shown). During rotation, the mixing screw 120 also moves back and forth in an axial direction, creating a combination of rotational and axial mixing which is highly efficient. During mixing, the mixing blades 124 continually pass between the stationary pins 144, yet the blades and the pins never touch each other. Also, the radial edges 126 of the blades 124 never touch the barrel inner surface 142, and the ends 146 of the pins 144 never touch the mixing screw shaft 122.

FIGS. 2–6 illustrate various screw elements which can be used to configure the mixing screw 120 for optimum use. FIGS. 2A and 2B illustrate on-screw elements 20 and 21 which are used in conjunction with a restriction ring assembly. The on-screw elements 20 and 21 each include a cylindrical outer surface 22, a plurality of blades 24 projecting outward from the surface 22, and an inner opening 26 with a keyway 28 for receiving and engaging a mixing screw shaft (not shown). The second on-screw element 21 is about twice as long as the first on-screw element 20.

Figure 2A:
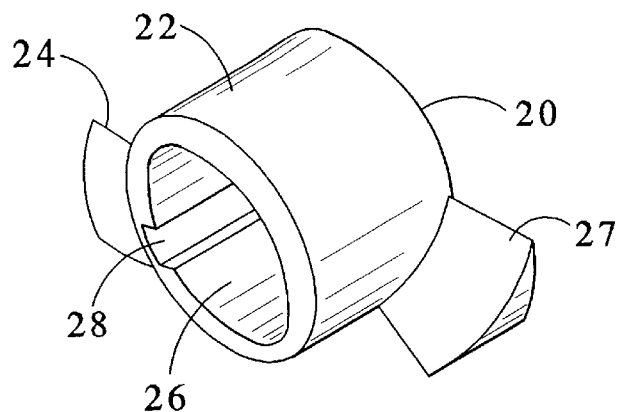
FIG. 2A is a perspective view of an on-screw element used on the upstream side of a restriction ring assembly, in the presently preferred high efficiency mixer configuration.
Figure 2B:
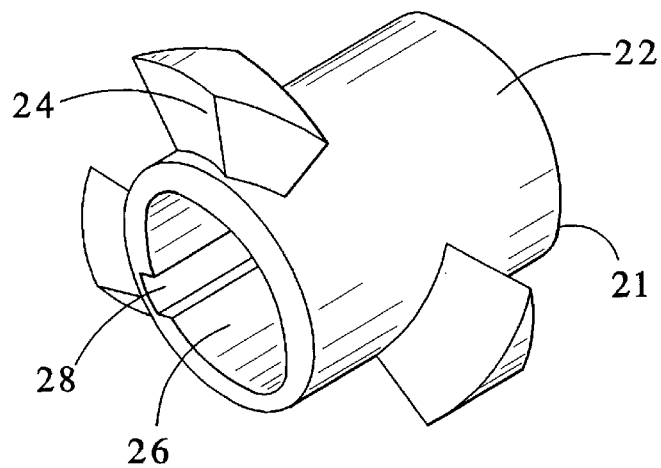
FIG. 2B is a perspective view of an on-screw element used on the downstream side of the restriction ring assembly in the presently preferred high efficiency mixer configuration.
Figure 2C:
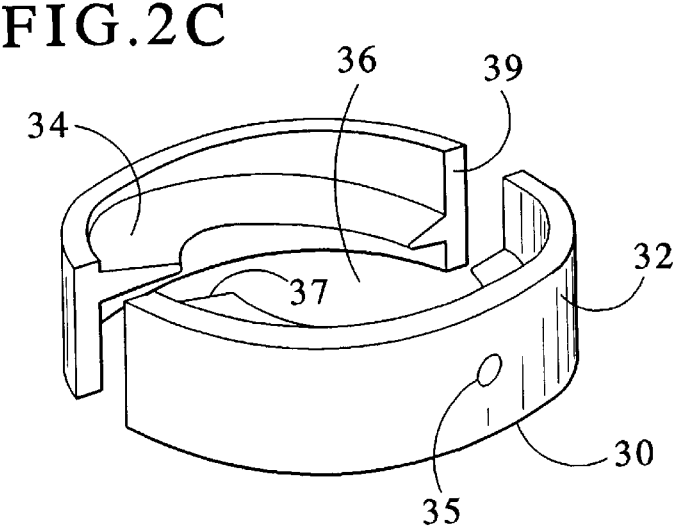
FIG. 2C is a perspective view of a restriction ring assembly used in the presently preferred high efficiency mixer configuration.

FIG. 2C illustrates a restriction ring assembly 30 used to build back pressure at selected locations along the mixing screw 120. The restriction ring assembly 30 includes two halves 37 and 39 mounted to the barrel housing 142, which halves engage during use to form a closed ring. The restriction ring assembly 30 includes a circular outer rim 32, an inner ring 34 angled as shown, and an opening 36 in the inner ring which receives, but does not touch, the on-screw elements 20 and 21 mounted to the screw shaft. Mounting openings 35 in the surface 32 of both halves of the restriction ring assembly 30 are used to mount the halves to the barrel housing 142.

Figure 3:
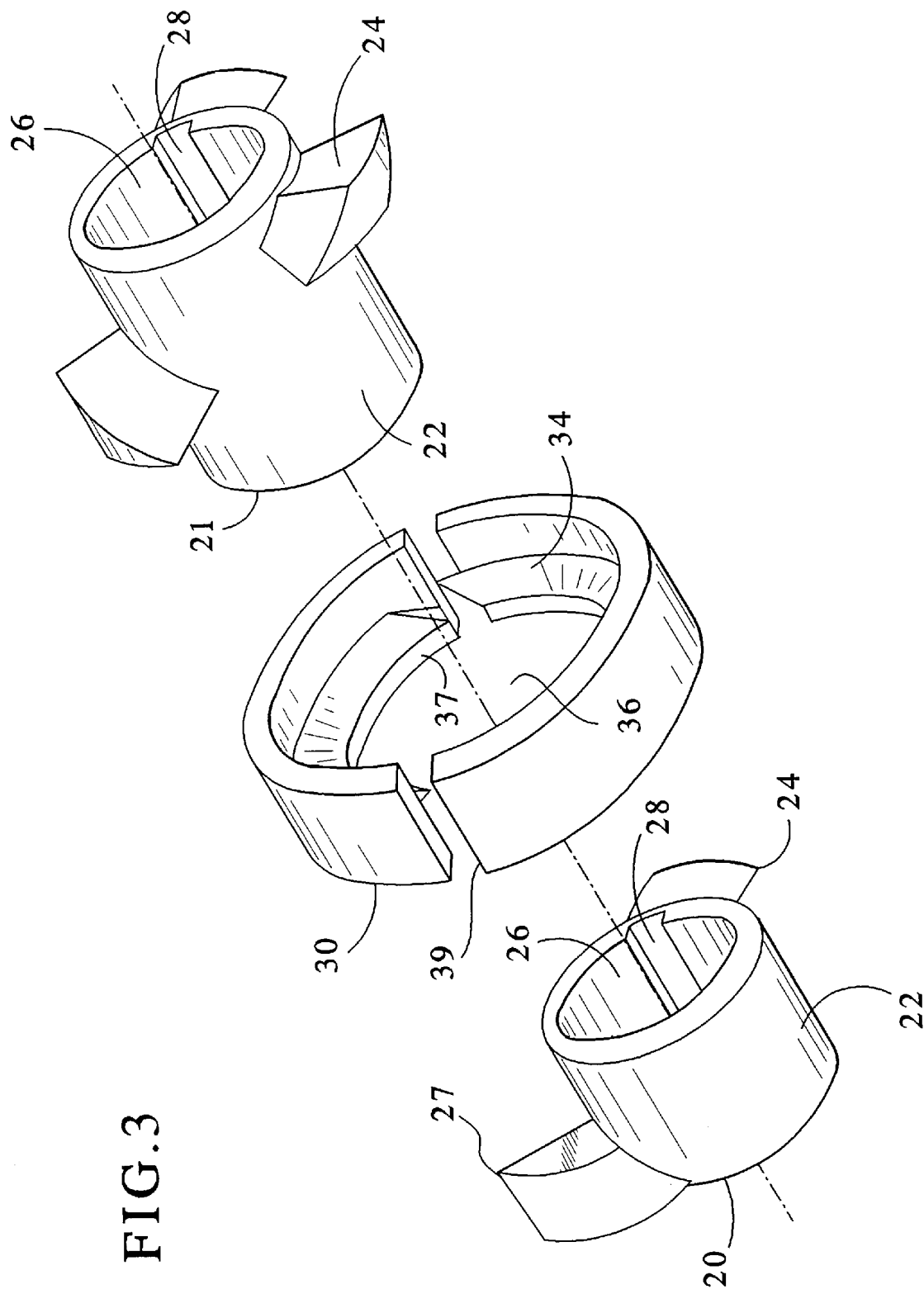
FIG. 3 is a perspective view showing the relative positioning of the elements of FIGS. 2A, 2B and 2C in the presently preferred high efficiency mixer configuration.

FIG. 3 illustrates the relationship between the restriction ring assembly 30 and the on-screw elements 20 and 21 during operation. When the mixing screw 120 is turning inside the barrel 140, and reciprocating axially, the clearances between the on-screw elements 20 and 21 and the inner ring 34 provide the primary means of passage of material from one side of the restriction ring assembly 30 to the other. The on-screw element 20 on the upstream side of the restriction ring assembly includes a modified blade 27 permitting clearance of the inner ring 34. The other on-screw element 21 is placed generally downstream of the restriction ring assembly 30, and has an end blade (not visible) which moves close to and wipes the opposite surface of the inner ring 34.

The clearances between outer surfaces 22 of the on-screw elements 20 and 21 and the inner ring 34 of the restriction ring assembly 30, which can vary and preferably are on the order of 1–5 mm, determine to a large extent how much pressure build-up will occur in the upstream region of the restriction ring assembly 30 during operation of the mixer 100. It should be noted that the upstream on-screw element 20 has an L/D of about ⅓, and the downstream on-screw element 21 has an L/D of about ⅔, resulting in a total L/D of about 1.0 for the on-screw elements. The restriction ring assembly 30 has a smaller L/D of about 0.45 which coincides with the L/D of the on-screw elements 20 and 21, which engage each other but do not touch the restriction ring assembly.

Figure 4:
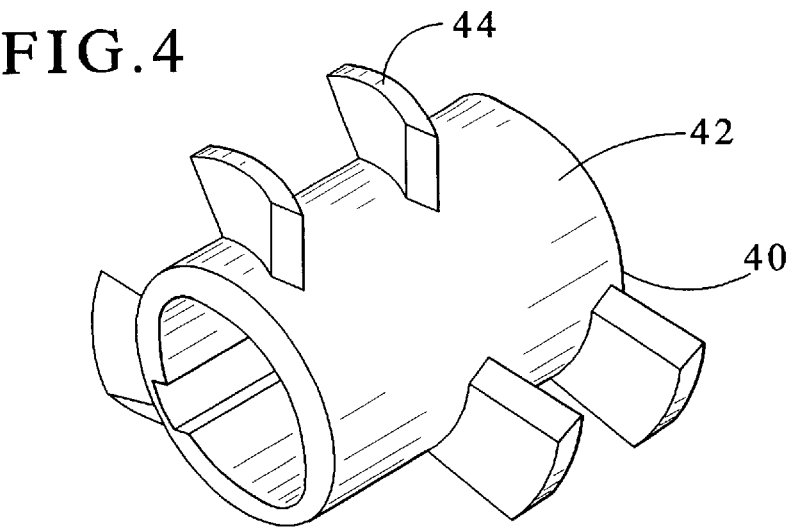
FIG. 4 is a perspective view of a low-shear mixing screw element used in the presently preferred high efficiency mixer configuration.
Figure 5:
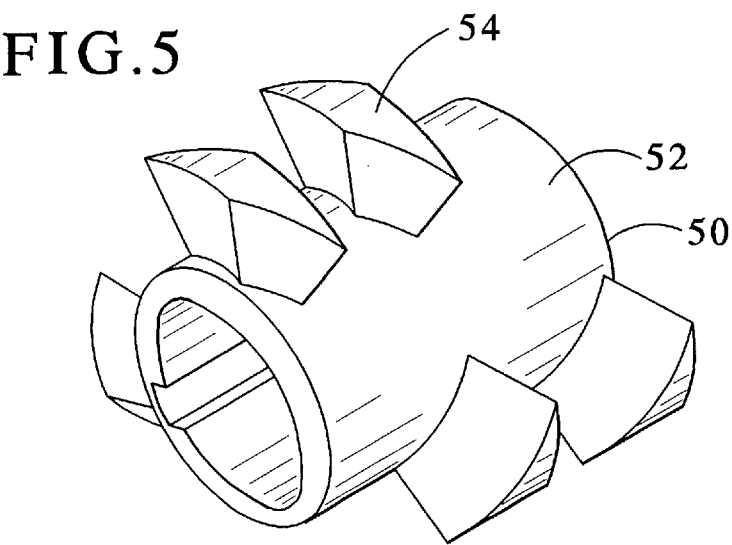
FIG. 5 is a perspective view of a high-shear mixing screw element used in the presently preferred high efficiency mixer configuration.

FIGS. 4 and 5 illustrate the mixing or "kneading" elements which perform most of the mixing work. The primary difference between the lower shear mixing element 40 of FIG. 4 and the higher shear mixing element 50 of FIG. 5 is the size of the mixing blades which project outward on the mixing elements. In FIG. 5, the higher shear mixing blades 54 which project outward from the surface 52 are larger and thicker than the lower shear mixing blades 44 projecting outward from the surface 42 in FIG. 4. For each of the mixing elements 40 and 50, the mixing blades are arranged in three circumferentially-spaced rows, as explained above with respect to FIG. 1. The use of thicker mixing blades 54 in FIG. 5 means that there is less axial distance between the blades and also less clearance between the blades 54 and the stationary pins 144 as the screw 120 rotates and reciprocates axially (FIG. 1). This reduction in clearance causes inherently higher shear in the vicinity of the mixing elements 50.

Figure 6:
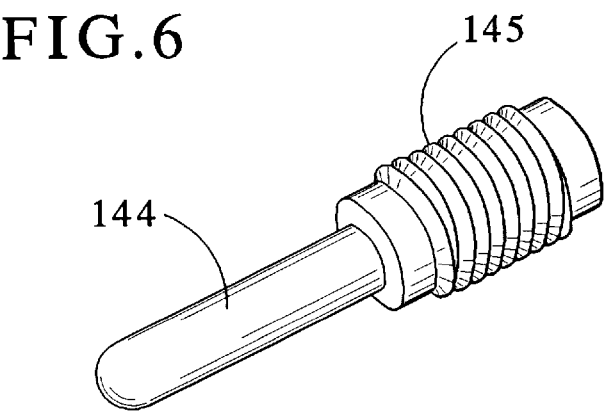
FIG. 6 is a perspective view of a barrel pin element used in the presently preferred high efficiency mixer configuration.

FIG. 6 illustrates a single stationary pin 144 detached from the barrel 140. The pin 144 includes a threaded base 145 which permits attachment at selected locations along the inner barrel shaft 142. It is also possible to configure some of the pins 144 as liquid injection ports by providing them with hollow center openings.

Figure 7:
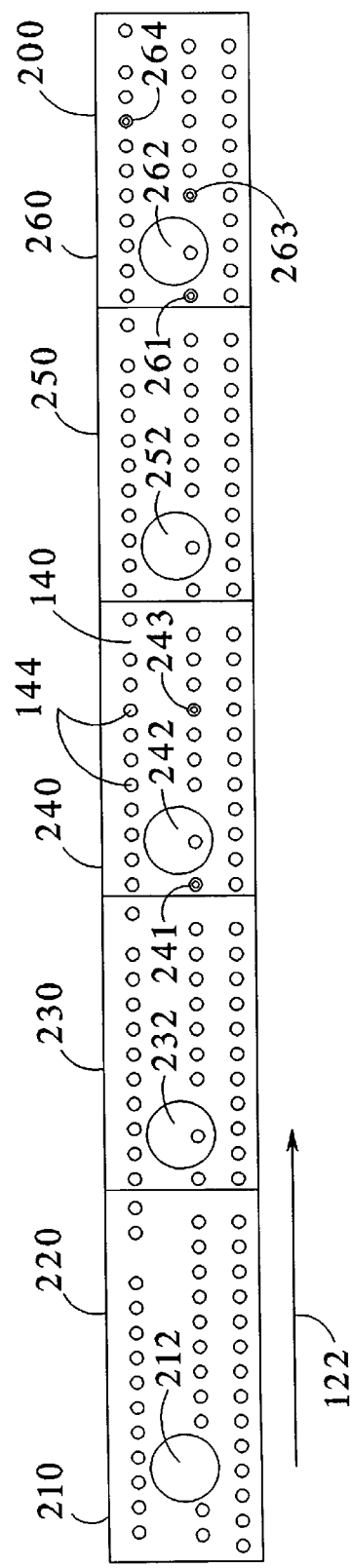
FIG. 7 is a schematic diagram of a presently preferred arrangement of mixing barrel pins and ingredient feed ports used to practice the method of the invention.
Figure 8:
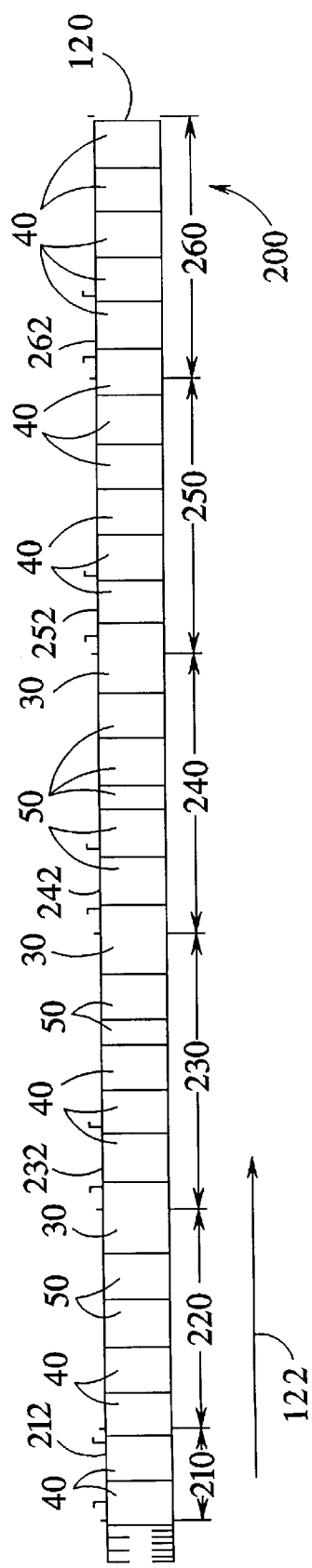
FIG. 8 is a schematic diagram of a presently preferred mixing screw configuration used to practice the method of the invention.

FIG. 7 is a schematic view showing the presently preferred barrel configuration, including the presently preferred arrangement of barrel pins 144. FIG. 8 is a corresponding schematic view illustrating the presently preferred mixing screw configuration. The mixer 200 whose preferred configuration is illustrated in FIGS. 7 and 8 has an overall active mixing L/D of about 19.

The mixer 200 includes an initial feed zone 210 and five mixing zones 220, 230, 240, 250 and 260. The zones 210, 230, 240, 250 and 260 include five possible large feed ports 212, 232, 242, 252 and 262, respectively, which can be used to add major (e.g. solid) ingredients to the mixer 200. The zones 240 and 260 are also configured with five smaller liquid injection ports 241, 243, 261, 263 and 264 which are used to add liquid ingredients. The liquid injection ports 241, 243, 261, 263 and 264 include special barrel pins 144 formed with hollow centers, as explained above.

Referring to FIG. 7, barrel pins 144 are preferably present in most or all of the available locations, in all three rows as shown.

Referring to FIG. 8, the presently preferred configuration of the mixing screw 120 for most chewing gum products is schematically illustrated as follows. Zone 210, which is the initial feed zone, is configured with about 1⅓ L/D of low shear elements, such as the element 40 shown in FIG. 4. The L/D of the initial feed zone 210 is not counted as part of the overall active mixing L/D of 19, discussed above, because its purpose is merely to convey ingredients into the mixing zones.

The first mixing zone 220 is configured, from left to right (FIG. 8), with two low shear mixing elements 40 (FIG. 4) followed by two high shear elements 50 (FIG. 5). The two low shear mixing elements contribute about 1⅓ L/D of mixing, and the two high shear mixing elements contribute about 1⅓ L/D of mixing. Zone 220 has a total mixing L/D of about 3.0, including the end part covered by a 57 mm restriction ring assembly 30 with cooperating on-screw elements 20 and 21 (not separately designated in FIG. 8).

The restriction ring assembly 30 with cooperating on-screw elements 20 and 21, straddling the end of the first mixing zone 220 and the start of the second mixing zone 230, have a combined L/D of about 1.0, part of which is in the second mixing zone 230. Then, zone 230 is configured, from left to right, with three low shear mixing elements 40 and 1.5 high shear mixing elements 50. The three low shear mixing elements contribute about 2.0 L/D of mixing, and the 1.5 high shear mixing elements contribute about 1.0 L/D of mixing. Zone 230 has a total mixing L/D of about 4.0.

Straddling the end of the second mixing zone 230 and the start of the third mixing zone 240 is a 60 mm restriction ring assembly 30 with cooperating on-screw elements 20 and 21 having an L/D of about 1.0. Then, zone 240 is configured, from left to right, with 4.5 high shear mixing elements 50 contributing a mixing L/D of about 3.0. Zone 240 also has a total mixing L/D of about 4.0.

Straddling the end of the third mixing zone 240 and the start of the fourth mixing zone 250 is another 60 mm restriction ring assembly 30 with cooperating on-screw elements having an L/D of about 1.0. Then, the remainder of the fourth mixing zone 250 and the fifth mixing zone 260 are configured with eleven low shear mixing elements 40 contributing a mixing L/D of about 7⅓. Zone 250 has a total mixing L/D of about 4.0, and zone 260 has a total mixing L/D of about 4.0.

Before explaining where the various chewing gum ingredients are added to the continuous mixer 200, and how they are mixed, it is helpful to discuss the composition of typical chewing gums that can be made using the method of the invention. A chewing gum generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, elastomer plasticizers (resins), fats, oils, waxes, softeners and inorganic fillers. The elastomers may include polyisobutylene, isobutylene-isoprene copolymer, styrene butadiene copolymer and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax.

The gum base typically also includes a filler component such as calcium carbonate, magnesium carbonate, talc, dicalcium phosphate and the like; softeners, including glycerol monostearate and glycerol triacetate; and optional ingredients such as antioxidants, color and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

In accordance with one embodiment of the invention, the gum base and ultimate chewing gum product are made continuously in the same mixer. Generally, the gum base portion is made using a mixing L/D of about 25 or less, preferably about 20 or less, most preferably about 15 or less. Then, the remaining chewing gum ingredients are combined with the gum base to make a chewing gum product using a mixing L/D of about 15 or less, preferably about 10 or less, most preferably about 5 or less. The mixing of the gum base ingredients and the remaining chewing gum ingredients may occur in different parts of the same mixer or may overlap, so long as the total mixing is achieved using an L/D of about 40 or less, preferably about 30 or less, most preferably about 20 or less.

When the preferred blade-and-pin mixer is used, having the preferred configuration described above, the total chewing gum can be made using a mixing L/D of about 19. The gum base can be made using an L/D of about 15 or less, and the remaining gum ingredients can be combined with the gum base using a further L/D of about 5 or less.

In order to accomplish the total chewing gum manufacture using the preferred blade-and-pin mixer 200, it is advantageous to maintain the rpm of the mixing screw 120 at less than about 150, preferably less than about 100. Also, the mixer temperature is preferably optimized so that the gum base is at about 130° F. or lower when it initially meets the other chewing gum ingredients, and the chewing gum product is at about 130° F. or lower (preferably 125° F. or lower) when it exits the mixer. This temperature optimization can be accomplished, in part, by selectively heating and/or water cooling the barrel sections surrounding the mixing zones 220, 230, 240, 250 and 260.

In order to manufacture the gum base, the following preferred procedure can be followed. The elastomer, filler, and at least some of the elastomer solvent are added to the first large feed port 212 in the feed zone 210 of the mixer 200, and are subjected to highly dispersive mixing in the first mixing zone 220 while being conveyed in the direction of the arrow 122. The remaining elastomer solvent (if any) and polyvinylacetate are added to the second large feed port 232 in the second mixing zone 230, and the ingredients are subjected to a more distributive mixing in the remainder of the mixing zone 230.

Fats, oils, waxes (if used), emulsifiers and, optionally, colors and antioxidants, are added to the liquid injection ports 241 and 243 in the third mixing zone 240, and the ingredients are subjected to distributive mixing in the mixing zone 240 while being conveyed in the direction of the arrow 122. At this point, the gum base manufacture should be complete, and the gum base should leave the third mixing zone 240 as a substantially homogeneous, lump-free compound with a uniform color.

The fourth mixing zone 250 is used primarily to cool the gum base, although minor ingredient addition may be accomplished. Then, to manufacture the final chewing gum product, glycerin, corn syrup, other bulk sugar sweeteners, high intensity sweeteners, and flavors can be added to the fifth mixing zone 260, and the ingredients are subjected to distributive mixing. If the gum product is to be sugarless, hydrogenated starch hydrolyzate or sorbitol solution can be substituted for the corn syrup and powdered alditols can be substituted for the sugars.

Preferably, glycerin is added to the first liquid injection port 261 in the fifth mixing zone 260. Solid ingredients (bulk sweeteners, encapsulated high intensity sweeteners, etc.) are added to the large feed port 262. Syrups (corn syrup, hydrogenated starch hydrolyzate, sorbitol solution, etc.) are added to the next liquid injection port 263, and flavors are added to the final liquid injection port 264. Flavors can alternatively be added at ports 261 and 263 in order to help plasticize the gum base, thereby reducing the temperature and torque on the screw. This may permit running of the mixer at higher rpm and throughput.

The gum ingredients are compounded to a homogeneous mass which is discharged from the mixer as a continuous stream or "rope". The continuous stream or rope can be deposited onto a moving conveyor and carried to a forming station, where the gum is shaped into the desired form such as by pressing it into sheets, scoring, and cutting into sticks. Because the entire gum manufacturing process is integrated into a single continuous mixer, there is less variation in the product, and the product is cleaner and more stable due to its simplified mechanical and thermal histories.

A wide range of changes and modifications to the preferred embodiments of the invention will be apparent to persons skilled in the art. The above preferred embodiments, and the examples which follow, are merely illustrative of the invention and should not be construed as imposing limitations on the invention. For instance, different continuous mixing equipment and different mixer configurations can be used without departing from the invention as long as the preparation of a chewing gum base and chewing gum product are accomplished in a single continuous mixer using a mixing L/D of not more than about 40.

EXAMPLE 1

Testing The Suitability Of A Continuous Mixer

The following preliminary test can be employed to determine whether a particular continuous mixer with a particular configuration meets the requirements of a high efficiency mixer suitable for practicing the method of the invention.

A dry blend of 35.7% butyl rubber (98.5% isobutylene —1.5% isoprene copolymer, with a molecular weight of 120,000–150,000, manufactured by Polysar, Ltd. of Sarnia, Ontario, Canada as POLYSAR Butyl 101-3); 35.7% calcium carbonate (VICRON 15-15 from Pfizer, Inc., New York, N.Y.); 14.3% polyterpene resin (ZONAREZ 90 from Arizona Chemical Company of Panama City, Fla.) and 14.3% of a second polterpene resin (ZONAREZ 7125 from Arizona Chemical Company) is fed into the continuous mixer in question equipped with the mixer configuration to be tested. The temperature profile is optimized for the best mixing, subject to the restriction that the exit temperature of the mixture does not exceed 170° C. (and preferably remains below 160° C.) to prevent thermal degradation. In order to qualify as a suitable high efficiency mixer, the mixer should produce a substantially homogeneous, lump-free compound with a uniform milky color in not more than about 10 L/D, preferably not more than about 7 L/D, most preferably not more than about 5 L/D.

To thoroughly check for lumps, the finished rubber compound may be stretched and observed visually, or compressed in a hydraulic press and observed, or melted on a hot plate, or made into a finished gum base which is then tested for lumps using conventional methods.

Also, the mixer must have sufficient length to complete the manufacture of the gum base, and of the chewing gum product, in a single mixer, using a total mixing L/D of not more than about 40. Any mixer which meets these requirements falls within the definition of a high-efficiency mixer suitable for practicing the method of the invention.

EXAMPLES 2–6

Continuous Chewing Gum Manufacture

The following examples were run using a Buss kneader with a 100 mm mixer screw diameter, configured in the preferred manner described above (unless indicated otherwise), with five mixing zones, a total mixing L/D of 19, and an initial conveying L/D of 1⅓. No die was used at the end of the mixer, unless indicated otherwise, and the product mixture exited as a continuous rope. Each example was designed with feed rates to yield chewing gum product at the rate of 300 pounds per hour.

Liquid ingredients were fed using volumetric pumps into the large feed ports and/or smaller liquid injection ports generally positioned as described above, unless otherwise indicated. The pumps were appropriately sized and adjusted to achieve the desired feed rates.

Dry ingredients were added using gravimetric screw feeders into the large addition ports positioned as described above. Again, the feeders were appropriately sized and adjusted to achieve the desired feed rates.

Temperature control was accomplished by circulating fluids through jackets surrounding each mixing barrel zone and inside the mixing screw. Water cooling was used where temperatures did not exceed 200° F., and oil cooling was used at higher temperatures. Where water cooling was desired, tap water (typically at about 57° F.) was used without additional chilling.

Temperatures were recorded for both the fluid and the ingredient mixture. Fluid temperatures were set for each barrel mixing zone (corresponding to zones 220, 230, 240, 250 and 260 in FIGS. 7 and 8), and are reported below as Z1, Z2, Z3, Z4 and Z5, respectively. Fluid temperatures were also set for the mixing screw 120, and are reported below as S1.

Actual mixture temperatures were recorded near the downstream end of mixing zones 220, 230, 240 and 250; near the middle of mixing zone 260; and near the end of mixing zone 260. These mixture temperatures are reported below as T1, T2, T3, T4, T5 and T6, respectively. Actual mixture temperatures are influenced by the temperatures of the circulating fluid, the heat exchange properties of the mixture and surrounding barrel, and the mechanical heating from the mixing process, and often differ from the set temperatures due to the additional factors.

All ingredients were added to the continuous mixer at ambient temperature (about 77° F.) unless otherwise noted.

EXAMPLE 2

This example illustrates the preparation of a sugar chunk bubble gum. For this example, the mixer configuration was varied slightly from the preferred configuration described above and used for Examples 2–6. Specifically, a round-hole 30 mm die was installed at the exit end of the mixer.

A blend of 68.9% high molecular weight polyvinyl acetate and 31.1% ground talc was added into the first large feed port 212 (FIG. 7), at 35.4 lb/hr. Polyisobutylene (preheated to 100° C.) was also added to port 212 at 3.95 lb/hr. Further downstream, in the first mixing zone 220, acetylated monoglyceride was injected at 2.6 lb/hr, using a liquid injection (hollow barrel pin) port not shown in FIG. 7.

Additional polyisobutylene (100° C.) at 3.95 lb/hr, and glycerol ester of partially hydrogenated wood rosin at 13.4 lb/hr, were added into the second large port 232. A mixture of 43.6% glycerol monostearate, 55.9% triacetin and 0.5% BHT was added at 6.7 lb/hr into the liquid injection port 241.

Glycerin was injected at 2.1 lb/hr into the liquid injection port 261. A mixture of 98.4% sucrose and 1.6% citric acid was added at 170.4 lb/hr into the large port 262. Corn syrup (40° C.) was injected at 58.5 lb/hr into liquid injection port 263, and a mixture of 60% lemon-lime flavor and 40% soy lecithin was added at 3.0 lb/hr into the liquid injection port 264.

The zone temperatures (Z1–Z5, ° F.) were ultimately set at 440, 440, 160, 61 and 61, respectively. The screw temperature (S1) was ultimately set at 80° F. The mixture temperatures (T1–T6, ° F.) were ultimately measured as 189, 176, 161, 97, 108 and 112, respectively. The screw rotation was 55 rpm.

At first, the product exited the extruder at 140° F. and exhibited signs of heat stress. The zone temperatures Z1 and Z2 were then reduced by 10° F. each, and the screw temperature S1 was raised by 20° F., to the values shown above. This caused the chewing gum exit temperature to drop to 122° F., and the product quality improved markedly.

During chewing, the product exhibited excellent texture, flavor, and bubble blowing characteristics. No rubber lumps were visible.

EXAMPLE 3

This example illustrates the preparation of a spearmint flavored sugarless gum. A mixture of 42.1% fine ground calcium carbonate, 18.9% glycerol ester of wood rosin, 16.7% glycerol ester of partially hydrogenated wood rosin, 17.0% ground butyl rubber, and 5.3% dusted ground (25:75) styrene butadiene rubber (75% rubber, 25% calcium carbonate) was added into port 212 (FIG. 7) at 38.4 lb/hr.

Low molecular weight polyvinyl acetate at 12.7 lb/hr, and polyisobutylene (preheated to 100° C.) at 7.6 lb/hr, were added into port 232.

A fat mixture (82° C.) was injected 50/50 into ports 241 and 243, at a total rate of 20.9 lb/hr. The fat mixture included 35.7% hydrogenated cottonseed oil, 30.7% hydrogenated soybean oil, 20.6% partially hydrogenated soybean oil, 12.8% glycerol monostearate and 0.2% BHT.

Unlike the previous examples, glycerin was injected at 25.5 lb/hr into the fourth mixing zone 250 (FIG. 7) through a liquid injection port (not shown). A coevaporated blend of hydrogenated starch hydrolysate and glycerin (at 40° C.) was injected further downstream in the fourth mixing zone 250 through another liquid injection port (not shown). The coevaporated blend included 67.5% hydrogenated starch hydrolysate solids, 25% glycerin and 7.5% water.

A mixture of 84.8% sorbitol, 14.8% mannitol and 0.4% encapsulated aspartame was added into port 262 in the fifth mixing zone 260, at 162.3 lb/hr. A mixture of 94.1% spearmint flavor and 5.9% lecithin was injected at 5.1 lb/hr into the port 264 located further downstream.

The zone temperatures (Z1–Z5, ° F.) were set at 400, 400, 150, 62 and 62, respectively. The screw temperature (S1) was set at 66° F. The mixture temperatures (T1–T6, ° F.) were measured as 307, 271, 202, 118, 103 and 116. The mixing screw rotation was 69 rpm.

The chewing gum product exited the mixer at 117° F. The gum had good appearance with no sorbitol spots or rubber lumps. The gum was slightly wet to the touch, sticky and fluffy (low density), but was acceptable. During chewing, the gum was considered soft initially but firmed up with continued chewing.

EXAMPLE 4

This example illustrates the preparation of a sugarless spearmint gum for use in coated pellets. A mixture of 28.6% dusted ground butyl rubber (75% rubber, 25% calcium carbonate), 27.4% high molecular weight terpene resin, 26.9% low molecular weight terpene resin and 17.1% calcium carbonate was added into port 212 (FIG. 7) at 41.9 lb/hr.

Low molecular weight polyvinyl acetate at 24.7 lb/hr, and polyisobutylene (preheated to 100° C.) at 1.7 lb/hr, were added into port 232.

A fat composition (82° C.) was injected 50/50 into ports 241 and 243 at a total rate of 21.7 lb/hr. The fat composition included 22.6% hydrogenated cottonseed oil, 21.0% hydrogenated soybean oil, 21.0% partially hydrogenated soybean oil, 19.9% glycerol monostearate, 15.4% glycerin and 0.2% BHT.

A 70% sorbitol solution was injected into the fourth mixing zone 250 (FIG. 7) at 17.4 lb/hr, using a hollow barrel pin liquid injection port (not shown).

A mixture of 65.8% sorbitol, 17.9% precipitated calcium carbonate and 16.3% mannitol was added at 184.2 lb/hr into the final large port 262. A mixture of 71.4% spearmint flavor and 28.6% soy lecithin was added at 8.4 lb/hr into the final liquid injection port 264.

The zone temperatures (Z1–Z5, ° F.) were set at 400, 400, 150, 61 and 61, respectively. The screw temperature (S1) was set at 65° F. The mixture temperatures (T1–T6, ° F.) were measured as 315, 280, 183, 104, 109 and 116, respectively. The screw rotation was set at 61 rpm.

The chewing gum exited the mixer at 127° F. The product appearance was good with no sorbitol spots or rubber lumps. However, the initial chew was reported as being rough and grainy.

EXAMPLE 5

This example illustrates the preparation of a peppermint flavored sugar chewing gum. A mixture of 27.4% dusted ground butyl rubber (75% butyl rubber dusted with 25% calcium carbonate), 14.1% lower softening terpene resin (softening point =85° C.), 14.4% higher softening terpene resin (softening point =125° C.) and 44.1% calcium carbonate was fed at 24.6 lb/hr into the first large feed port (port 212 in FIGS. 7 and 8).

A mixture of 73.5% low molecular weight polyvinyl acetate, 9.2% high molecular weight polyvinyl acetate, 8.6 lower softening terpene resin and 8.7% higher softening terpene resin was fed at 17.4 lb/hr into the second large feed port 232. Polyisobutylene was also added at 3.5 lb/hr into this port.

A fat mixture, preheated to 83° C., was injected into the liquid injection ports in the third mixing zone (ports 241 and 243 in FIG. 7), at a total rate of 14.5 lb/hr, with 50% of the mixture being fed through each port. The fat mixture included 0.2% BHT, 2.5% cocoa powder, 31.9% hydrogenated cottonseed oil, 19.8% glycerol monostearate, 18.7% hydrogenated soybean oil, 13.7% lecithin, and 13.2% partially hydrogenated cottonseed oil.

A mixture of 84.6% sugar and 15.4% dextrose monohydrate was injected at 203.1 lb/hr into the large feed port 262 in the fifth mixing zone. Glycerin was added at 3.9 lb/hr into the first liquid injection port 261 in the fifth mixing zone. Corn syrup, preheated to 44°C., was added at 30.0 lb/hr into the second liquid injection port 263 in the fifth mixing zone. A mixture of 90.0% peppermint flavor and 10.0% lecithin was injected into the third liquid injection port 264 in the fifth mixing zone at 3.0 lb/hr.

The zone temperatures Z1–Z5 were set (in ° F.) at 350, 350, 110, 25 and 25, respectively. The mixing screw temperature S1 was set at 101° F. The mixer temperatures T1–T6 were measured at steady state (in ° F.) as 320, 280, 164, 122, 105 and 103, respectively. The screw rotation was 63 rpm, and the product exited the mixer at 52–53° C.

The peppermint sugar gum product was desirably soft, and acceptable in quality.

EXAMPLE 6

This example illustrates the preparation of a sugarless stick bubble gum. For this example, the screw configuration shown in FIG. 8, and used for the previous examples, was varied as follows. The conveying section 210 and mixing sections 220, 250 and 260 were configured substantially as before. In the second mixing zone 230, the three low shear elements 40 were also not changed.

Thereafter, the 1½ high shear elements 50 in zone 230, the restriction element 30 overlapping zones 230 and 240, all of zone 240, and the restriction element 30 overlapping zones 240 and 250 were removed. Three high shear elements 50 (combined L/D =2.0) were placed in zone 230 and extended into zone 240. Two and one-half low shear elements 40 (combined L/D =1⅔) followed in zone 240. Then, three and one-half high shear elements 50 (combined L/D =2⅓) followed in zone 240 and extended into zone 250. The eleven low-shear elements 40 in zones 250 and 260 were not changed.

To make the product, a mixture of 53.3% high molecular weight polyvinyl acetate, 31.0% talc, 12.2% glycerol ester of wood rosin and 3.5% dusted ground (25:75) styrene-butadiene rubber (75% rubber, 25% calcium carbonate) were fed into the large port 212 (FIG. 7) at 54.9 lb/hr. Polyisobutylene (preheated to 100° C.) was pumped into the same port at 9.0 lb/hr.

Glycerol ester of partially hydrogenated wood rosin at 15.3 lb/hr, and triacetin at 4.4 lb/hr, were added into the large port 232 in the second mixing zone 230.

A fat/wax mixture (at 82° C.) was fed 50/50 into the liquid injection ports 241 and 243 in the third mixing zone 240, at a total rate of 13.9 lb/hr. The mixture included 50.3% glycerol monostearate, 49.4% paraffin (m.p. =135° F.) and 0.3% BHT.

Diluted glycerin was injected into the fourth mixing zone 250 at 28.2 lb/hr using a liquid injection port (not shown). The dilution was 87% glycerin and 13% water.

A mixture of 84.0% sorbitol, 12.7% mannitol, 1.1% fumaric acid, 0.2% aspartame, 0.4% encapsulated aspartame, 0.7% adipic acid and 0.9% citric acid was fed into port 262 in the fifth mixing zone 260 at 165.0 lb/hr. A mixture of 51.6% bubble gum flavor and 48.4% soy lecithin was injected into port 264 in zone 260 at 9.3 lb/hr.

The zone temperatures (Z1–Z5, ° F.) were set at 350, 350, 100, 64 and 64, respectively. The screw temperature (S1) was set at 100° F. The mixture temperatures (T1–T6, ° F.) were recorded as 286, 260, 163, 107, 104 and 112, respectively. The screw rotation was 75 rpm.

The chewing gum exited the mixer at 118° F. The finished product looked good and contained no base lumps. The flavor and texture were very good during chewing, as were the bubble blowing characteristics.

Figure 9:
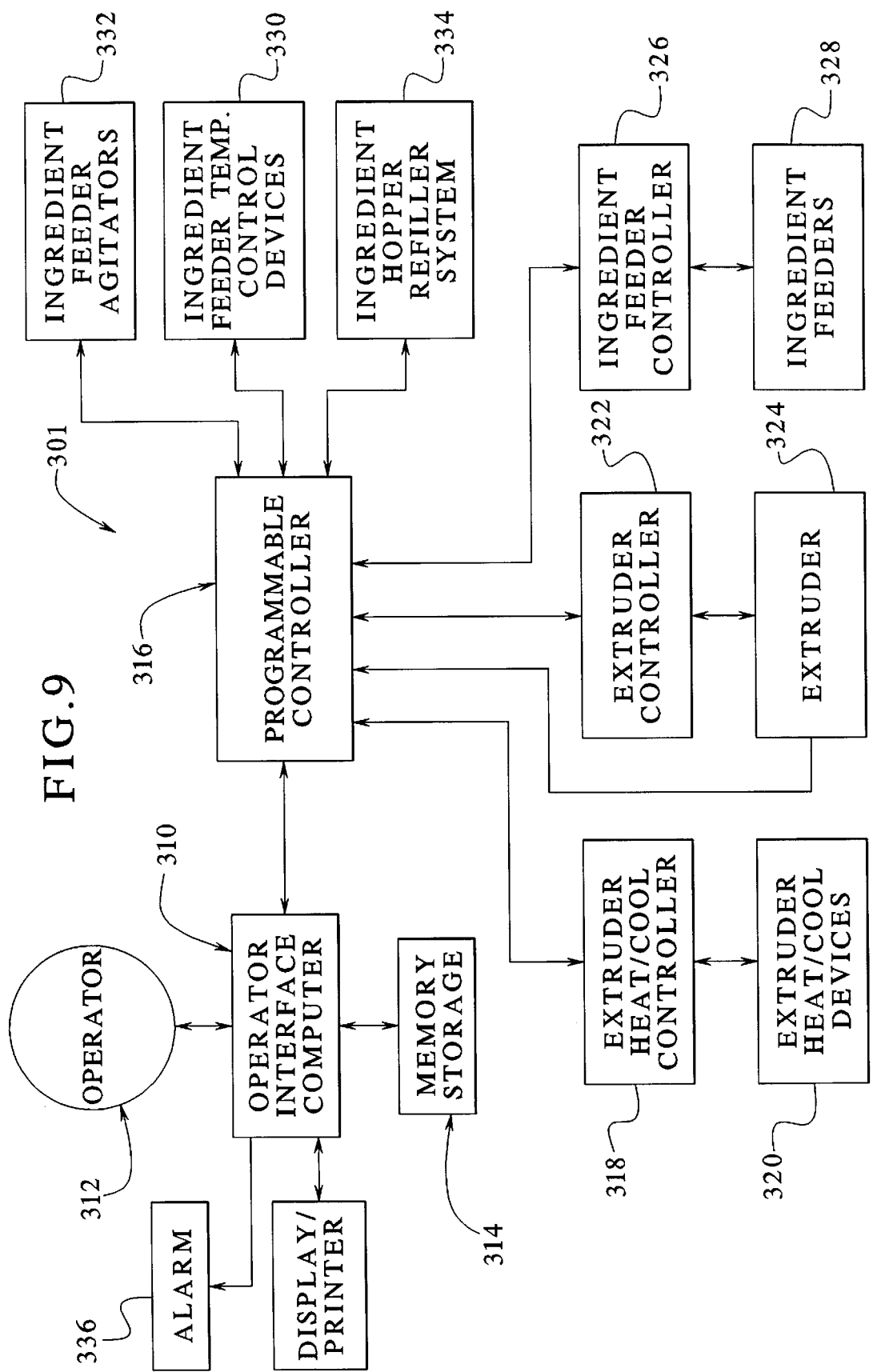
FIG. 9 is a black box diagram of the system components of the present invention to perform automatic continuous production of chewing gum.
Figure 10:
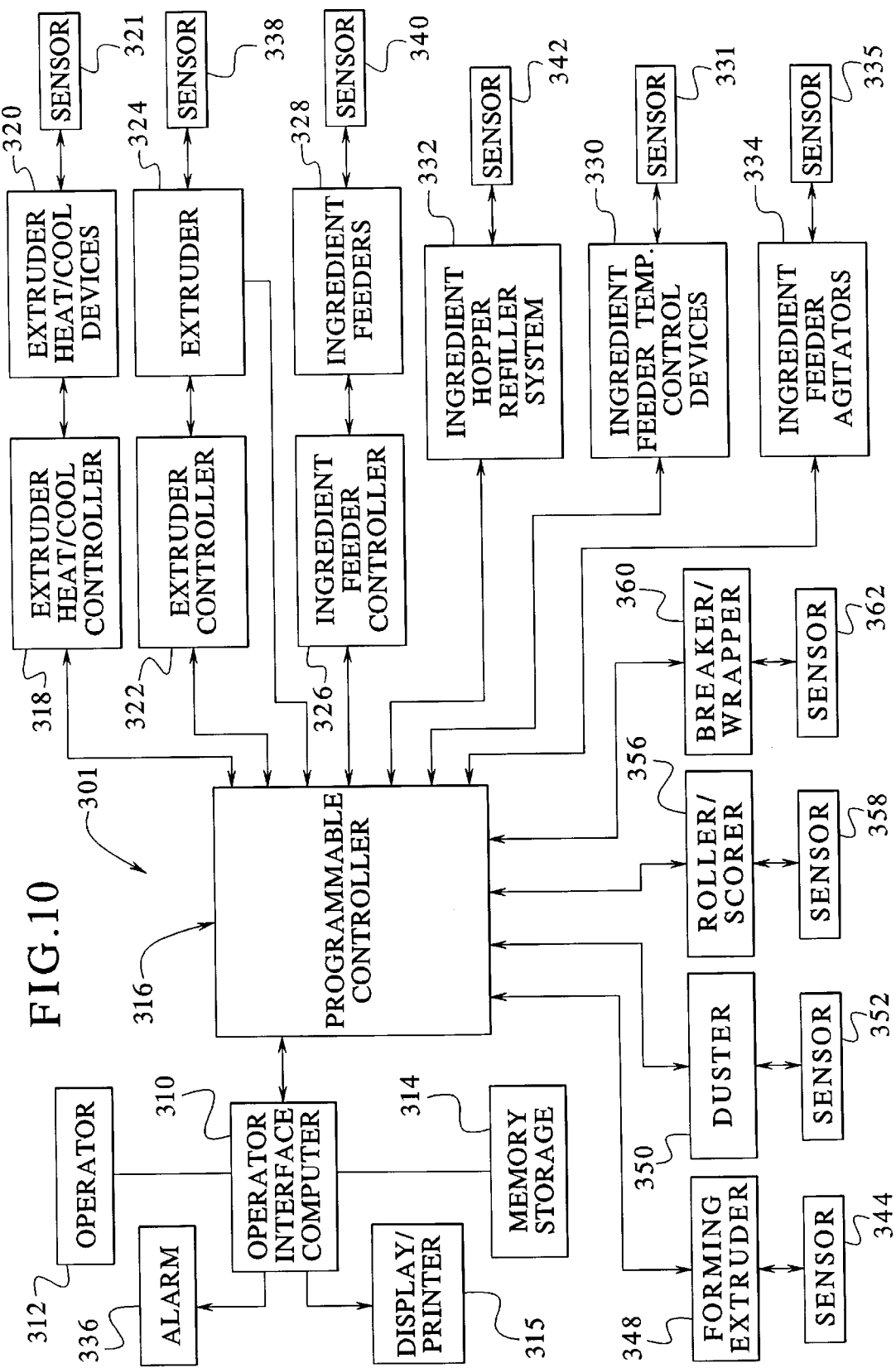
FIG. 10 is a black box diagram of the system components of the present invention to perform automatic continuous production of chewing gum as well as the components necessary for automated downstream processing of the chewing gum subsequent to mixing.

Referring now to FIGS. 9 and 10, an embodiment of the system 301 of the present invention is generally illustrated in the form of an automated process control system 301. The process control system 301 includes a number of components including an operator interface computer 310 capable of being controlled by, for example, a human operator 312 or, alternatively, a memory storage device 314. To this end, the operator interface computer 310 receives process control parameters from the operator 312 and/or the memory storage device 314. The process control parameters are sent to a programmable controller 316. As an example of process control parameters, ingredients percentages may be entered into the operator interface computer 310 and converted into, for example, feeder rate set points. Alternatively, feeder rate set points may be directly entered by the operator 312. The operator interface computer 310 further receives real time operation data from the programmable controller 316 and may provide data to the operator 312 via a graphical interface (not shown). The operator interface computer 310 may further store data and process parameters in the memory storage device 314. Printed or on-line reports of current or archival run information to the operator 312 may further be provided on a display 315 and/or sent to a printer. This may be implemented by those skilled in the art.

As illustrated, the programmable controller 316 receives formula and process parameters from the operator interface computer 310. The programmable controller 316 is capable of performing control algorithms and logical operations and transmits real-time instructions to device controllers to be described hereinafter. Further, the programmable controller 316 may receive real-time data from the device controllers and relay the real-time data to the operator interface computer 310. Alternatively, devices may be directly controlled by the programmable controller 316. Such devices include, but are not limited to, ingredient feed agitators, heaters, hopper refillers, and the like. In an embodiment, control functions handled by dedicated controllers, e.g., ingredient feed rate control, may alternatively be handled by the programmable controller 316. Further, the programmable controller 316 may provide inventory and order data to maintain supplies of ingredients at optimum levels.

One such device controller referenced above includes an extruder heating and cooling controller 318. The extruder heat/cool controller 318 receives both start and stop instructions and extruder zone temperature parameters from the programmable controller 316. Further, real-time temperature data is received from extruder heating and cooling devices 320 using sensors 321 known in the art. The extruder heat/cool controller 318 turns the extruder heat/cool devices 320 on and off and/or modulates them to maintain actual temperatures within ranges specified and input via the process control parameters. Further, the extruder heat/cool controller 318 relays actual temperature data to the programmable controller 316.

Another device controller used in the system of the present invention is an extruder controller 322. The extruder controller 322 receives start and stop instructions as well as parameters, such as revolutions per minute, from the programmable controller 316. Further, the extruder controller 322 may receive at least real-time material temperatures, rpm, torque, and power data from an extruder 324. An extruder motor (not shown) of the extruder 324 is controlled by the extruder controller 322 to maintain the speed at an rpm specified by the process parameters. The extruder controller 322 may further relay operation data including temperatures from the extruder 324 to the programmable controller 316.

Yet another device controller used in the system of the present invention is an ingredient feeder controller 326. The ingredient feeder controller 326 receives start and stop instructions and ingredient feed rates from the programmable controller 316. Further, real-time weights and rpm data are received by the ingredient feeder controller 326 from ingredient feeders 328. As a result, the ingredient feeder controller 326 calculates actual feed rates and controls feeder speed to maintain feed rates within specified ranges. Compensation for erratic weight changes during hopper refill events may also be controlled by the ingredient feeder controller 326. Further, the ingredient feeder controller 326 allows for relay of data from the feeders 328 to the programmable controller 316. The types of ingredients that may be fed include those required for producing a completed chewing gum, finished chewing gum base, gum only and/or gum base ingredients.

The process control system 301 of the present invention also includes a plurality of controlled devices. A first such device is the memory storage device 314 which provides for non-volatile storage of digital information, such as, for example, on a disk or a tape.

Other controlled devices include the extruder heat/cool devices 320 which heat or cool a multiplicity of zones on the extruder 324. Typically, cooling may be performed by circulating fluid through a jacket surrounding a barrel of the extruder 324. Heating, on the other hand, may be accomplished by electric heaters placed on walls of the extruder 324. Preferably, however, circulating a heated fluid through a jacket surrounding a barrel of the extruder 324 is implemented to conduct heating of the extruder 324.

The extruder 324 also includes one or more screw shafts that are rotated. Alternatively, the extruder 324 may be imparted with a reciprocating axial motion and rotation such as described above with reference to FIGS. 1–8. The shafts are rotated by a motor and an associated drive train. Temperature sensors 338 may be provided projecting inward from a barrel wall to measure temperature of products at selected points along the length of the extruder 324.

The ingredient feeders 328 of the system of the present invention may include feeding of both liquid and dry material by gravimetric feeders which transfer ingredients into the extruder 324. The feeding is accomplished by a variable speed motor that drives a pump or an auger. However, other ingredient feeders are contemplated and known in the art such as vibrating pans or trays, rotary valves, mass flow meters or variable aperture discharge valves. Such feeders may be implemented by those skilled in the art. A scaling system or sensors 340 may be implemented to weigh the ingredient feeders and its contents; this information is then used by the ingredient feeder controller 326 to maintain the desired feed rate. A hopper level detector 342 may also be implemented to transmit information to the programmable controller 316 for directing the refill of the hopper. Preferably, however, hopper refill is triggered through a weight sensor associated with the gravimetric feeders. Upon detection of a drop in total weight below a preset value indicating a low hopper level, a refill device is automatically triggered to refill the particular hopper.

Other control devices include feeder temperature control devices 330, ingredient feeder agitators 332 and an ingredient hopper refiller system 334. The ingredient feed temperature control devices 330 may include various type of heaters and/or chillers which maintain the temperature of hoppers, feed lines, tanks and other feeder components within acceptable ranges and transmit actual temperatures to the programmable controller 316. Such variables are sensed with appropriate sensors 331 in communication with the feeder temperature control devices 330 and the programmable controller 316. The ingredient feeder agitators 332 may include stirrers and vibratory devices that prevent bridging and blocking in the feeders. Such conditions may be sensed using appropriate sensors 335 operatively connected to the agitators 334 and providing a signal to the programmable controller 316. Preferably, agitation and vibration occurs at defined intervals of time or at predetermined hopper levels or based on other sensed conditions rather than direct sensing of a blockage condition to activate agitation. Finally, the ingredient hopper refiller system 334 includes the capability to refill the ingredient feeder hopper when directed by the programmable controller 316. To this end, refill confirmation and current inventory or ingredient usage status are transmitted to the programmable controller 316.

Preferably, a multi-level alarm 336 is also provided in the system 301 of the present invention. The alarm 336 includes a first level having a message capability which provides indication of a failure or an out-of-specification reading of a non-critical nature. For example, the failure of a product temperature sensor may be indicated by the message alarm. A message may be displayed on a monitor, but no further action is necessarily taken by the programmable controller 316. An audible warning may also be provided in addition to the message.

A second level of warning on the alarm 336 is a warning of a failure or out-of-specification performance that is critical to continued operation of the system 301. A warning alarm may indicate an impeding critical alarm if the problem is not corrected within a specified time interval. This time interval may vary depending on the particular system affected and/or the degree of departure from the specified tolerance. A warning message may also be displayed on a monitor and/or an audible warning may be sounded.

A third level of the alarm 336 is the critical alarm condition indicating a failure requiring immediate shutdown of the system 301. A warning condition that has not been corrected within an allowable predetermined time interval may also trigger a critical alarm. Automatic shut down of the extruder 324 may be initiated and accompanied by a message on a monitor and/or an audible warning. Override provisions may be provided to allow the operator 312 to prevent automatic shutdown if such action is appropriate.

The above description describes the process control system 301 in its basic form. However, two or more device controllers may be combined into a single unit. For example, a single controller may be provided to handle extruder motor control and extruder heat/cool control functions. Likewise, agitators and feeder temperature control functions may be handled by a separate controller rather than directly controlled by the programmable controller 16 as described above.

Furthermore, the operator interface computer 310 may be used as an interface between the programmable controller 316 and one or more of the device controllers, such as the extruder heat/cool controller 318, the extruder controller 322 and/or the ingredient feeder controller 326.

Furthermore, a portion or all of the run data, such as actual temperatures, actual feed rates and the like, may be stored on a permanent media for later review. This is beneficial when an end product has been found to be defective and review of the run data may assist in identifying the reasons for the defect. Storage of such data may be provided on a memory storage device controlled by the operator interface computer 10 or the programmable controller 316.

Furthermore, alarm conditions may be detected by device controllers and relayed to the programmable controller 316. Alternatively, the device controller may simply relay data to the programmable controller 316 which then makes the determination whether an alarm condition exists. Likewise, separate distinct subsystems may be used in each arrangement.

Hopper refill has been described above as preferably being performed by automated equipment. In some instances, however, hopper refill may be desirably accomplished manually by directing the operator 312 via the operator interface computer 310 of the requirement for hopper refill. Associated monitors and/or audible signals may be implemented to warn the operator of the need for hopper refill.

The ingredient feeder controller 326 may also control volumetric devices in addition to or in lieu of the described gravimetric feeders. Further, data from devices not required for control purposes, in addition to data that is required for control purposes, may be relayed through one or more device controllers to the programmable controller 316 or may be sent to the programmable controller 316 directly. One example is ingredient temperature measurement.

Following mixing, additional automation is performed including the steps of sheeting and wrapping the chewing gum product. More specifically, the extruder 324 may be fitted with a die to form the gum into a slab, a sheet, a rope or other desired initial shape. Alternatively, the unformed output from the mixing extruder may be transferred into a secondary forming extruder 348 which produces the initial shape. An automated operation may make use of inputs, such as pressure and dimension of the gum output to control extruder temperature and speed, and take away speed, for example, of a conveyor, for the output to control the dimensions of the formed gum stream. Appropriate sensors 344 may be implemented to sense particular parameters to control the forming extruder 348.

After leaving the forming extruder 348, the gum may be moved by a transport device, such as a conveyor, or fed directly into rollers. Prior to entering the rollers, the gum is preferably dusted with a suitable rolling compound, such as sugar or mannitol, by a duster 350. The automated control system 301 may further include optical inspection or gravimetric inputs using appropriate sensors 352 to regulate the application of the rolling compound and/or the speed of the gum passing through an applicator device.

If the gum is to be formed into, for example, sticks or tabs, the formed and dusted product is fed into one or more sets of rollers 354 which reduce the thickness of the gum to its desired final value. The product may then be simultaneously or separately scored to produce the final piece dimensions. The automated process control system 301 may be implemented to monitor with appropriate sensors 358 such values as dimensions and temperature of the product and uses these measurements to control roller speeds, spacing, i.e., roller separation and temperature.

Finally, once the gum is formed and scored into its final shapes, a sequence of wrapping operations is performed by a wrapping machine 360 for covering and combining the product into units suitable for consumer use, consumer purchase, retail display and shipping. Prior to wrapping, the scored product is divided into defined units as desired. Therefore, cutting or breaking of the scored product is performed during the wrapping as indicated in FIG. 10. The wrapping operations are automatically and continuously controlled in various ways. For example, the rate of feed and wrapping is controlled to maximize efficiency for changes in production speed and wrapping variables. The temperatures of incoming gum pieces can be optimized by controlling upstream operations. Various operations of the wrapping machine 360 are made to allow for variations in the gum product and wrapping materials detected by various types of sensors 362.

As a result of the automated control process described above, labor costs and manufacturing variability and errors are significantly reduced. Further, manufacturing flexibility is increased, and waste material is reduced. Further, the efficiencies result in a more consistent quality of the resultant product.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for automatically and continuously producing chewing gum, the method comprising the steps of:

inputting operational parameters;

automatically and continuously feeding ingredients into a mixer without the separate manufacture of gum base wherein the ingredients are necessary for continuous production of chewing gum;

automatically and continuously mixing the ingredients in the mixer; and controlling the automatic and continuous feeding and mixing based on the operational parameters.

2. The method of claim 1 further comprising the steps of:

monitoring properties of the ingredients; and providing a signal indicative of the properties.

3. The method of claim 1 further comprising the step of:

providing an alarm to signal an error condition during production of the chewing gum.

4. The method of claim 1 further comprising the steps of:

monitoring feed rates of the ingredients fed during production; and providing a signal indicative of the feed rate.

5. The method of claim 1 further comprising the step of:

displaying the operational parameters continuously and in real time during production.

6. The method of claim 1 further comprising the steps of:

continuously discharging the mixed ingredients; and automatically forming the mixed ingredients into a predetermined shape.

7. The method of claim 1 further comprising the step of:

automatically forming the mixed ingredients into a predetermined shape; and automatically dusting the predetermined shape.

8. The method of claim 1 further comprising the step of:

automatically forming the mixed ingredients into a predetermined shape and dusting the predetermined shape during formation.

9. The method of claim 1 further comprising the step of:

automatically forming the mixed ingredients into a predetermined shape and dusting, scoring, rolling, breaking and wrapping the predetermined shape or defined units divided from the predetermined shape following formation.

10. The method of claim 6 further comprising the step of:

automatically rolling the predetermined shape.

11. The method of claim 6 further comprising the step of:

automatically scoring the predetermined shape.

12. The method of claim 6 further comprising the step of:

automatically wrapping the predetermined shape following division into a plurality of defined units.

13. A method for automatically and continuously producing chewing gum, the method comprising the steps of:

feeding chewing gum ingredients into a continuous mixer;

inputting operational parameters necessary for producting the chewing gum;

sensing properties of the chewing gum ingredients and the mixture during production;

controlling production based on the sensed properties;

mixing the chewing gum ingredients in the continuous mixer to form a mixture;

discharging the mixture from the continuous mixer;

automatically forming the mixture into a predetermined shape;

scoring the predetermined shape to define units; and automatically wrapping the predetermined shape following division into defined units.

14. The method of claim 13 further comprising the step of:

dusting the predetermined shape with a substance.

15. The method of claim 13 further comprising the steps of:

sensing properties of the chewing gum ingredients and the mixture during production; and comparing the sensed properties with the operational parameters.

16. The method of claim 15 further comprising the step of:

controlling production of the chewing gum based on the comparison.

17. The method of claim 13 further comprising the step of:

providing an alarm indicative of a predetermined condition detected during production.

18. The method of claim 13 further comprising the step of:

displaying continuously and in real time status of production and other operational parameters.

19. A method for automatically and continuously producing chewing gum without the separate manufacture of gum base, the method comprising the steps of:

inputting operational parameters;

automatically and continuously feeding ingredients into a mixer wherein the ingredients are necessary for the continuous production of chewing gum without the separate manufacture of gum base;

automatically and continuously mixing the ingredients in the mixer; and controlling the automatic and continuous feeding and mixing based on the operational parameters.

20. The method of claim 19 further comprising the steps of:

monitoring properties of the ingredients; and providing a signal indicative of the properties.

21. The method of claim 19 further comprising the step of:

providing an alarm to signal an error condition during production of the chewing gum.

22. The method of claim 19 further comprising the steps of:

monitoring a feed rate of the ingredients fed during production; and providing a signal indicative of the feed rate.

23. The method of claim 19 further comprising the step of:

displaying operational parameters continuously and in real time during production.

24. The method of claim 19 further comprising the steps of:

continuously discharging the mixed ingredients; and automatically forming the mixed ingredients into a predetermined shape.

25. The method of claim 19 further comprising the step of:

automatically forming the mixed ingredients into a predetermined shape; and automatically dusting the predetermined shape.

26. The method of claim 19 further comprising the step of:

automatically forming the mixed ingredients into a predetermined shape and dusting the predetermined shape during formation.

27. The method of claim 19 further comprising the step of:

automatically forming the mixed ingredients into a predetermined shape and dusting, scoring, rolling, breaking and wrapping the predetermined shape or defined units divided from the predetermined shape following formation.

28. The method of claim 19 further comprising the step of:

automatically rolling the predetermined shape.

29. The method of claim 19 further comprising the step of:

automatically scoring the predetermined shape.

30. The method of claim 19 further comprising the step of:

automatically wrapping the predetermined shape following division into a plurality of defined units.

* * * * *